(12) United States Patent
Chen et al.

(10) Patent No.: US 9,787,238 B2
(45) Date of Patent: Oct. 10, 2017

(54) FOUR-PHASE SWITCHED RELUCTANCE MOTOR TORQUE RIPPLE THREE-LEVEL SUPPRESSION METHOD

(71) Applicant: CHINA UNIVERSITY OF MINING AND TECHNOLOGY, Xuzhou (CN)

(72) Inventors: Hao Chen, Xuzhou (CN); Hui Zeng, Xuzhou (CN)

(73) Assignee: CHINA UNIVERSITY OF MINING AND TECHNOLOGY, Xuzhou (CN)

( * ) Notice: Subject to any disclaimer, the term of this patent is extended or adjusted under 35 U.S.C. 154(b) by 0 days.

(21) Appl. No.: 15/124,238

(22) PCT Filed: Aug. 19, 2015

(86) PCT No.: PCT/CN2015/087501
§ 371 (c)(1),
(2) Date: Sep. 7, 2016

(87) PCT Pub. No.: WO2016/029816
PCT Pub. Date: Mar. 3, 2016

(65) Prior Publication Data
US 2017/0019049 A1 Jan. 19, 2017

(30) Foreign Application Priority Data
Aug. 27, 2014 (CN) .......................... 2014 1 0432801

(51) Int. Cl.
*H02P 6/10* (2006.01)
*H02P 25/08* (2016.01)
(Continued)

(52) U.S. Cl.
CPC .............. *H02P 25/098* (2016.02); *H02P 6/10* (2013.01)

(58) Field of Classification Search
CPC .......... H02P 25/098; H02P 25/10; H02P 6/00; H02P 6/10
(Continued)

(56) References Cited

U.S. PATENT DOCUMENTS

| 5,821,725 A | * | 10/1998 | Wang | ........................ | H02P 6/10 |
| | | | | | 318/432 |
| 6,577,087 B2 | | 6/2003 | Su | | |

(Continued)

FOREIGN PATENT DOCUMENTS

| CN | 102545743 A | 7/2012 |
| CN | 102790566 A | 11/2012 |
| CN | 104242745 A | 12/2014 |

OTHER PUBLICATIONS

International Search Report dated Nov. 18, 2015.

*Primary Examiner* — Bentsu Ro
*Assistant Examiner* — Said Bouziane
(74) *Attorney, Agent, or Firm* — Heslin Rothenberg Farley & Mesiti P.C.

(57) ABSTRACT

A four-phase switched reluctance motor torque ripple three-level suppression method. A first set of torque thresholds is set in rotor position interval $[0°, \theta_r/4]$. A second set of torque thresholds is set in rotor position interval $[\theta_r/4, \theta_r/2]$. Power is supplied to adjacent phase A and phase B for excitation. The power supplied for excitation to phase A leads the power supplied for excitation to phase B by $\theta_r/4$. An entire commutation process from phase A to phase B is divided into two intervals. In rotor position interval $[0°, \theta_1]$, phase A uses the second set of torque thresholds while phase B uses the first set of torque thresholds. Critical position $\theta_1$ automatically appears in the commutation process, thus obviating the need for additional calculations. Total torque is controlled between $[T_e+th2_{low}$ and $T_e+th2_{up}]$. In rotor position interval $[\theta_1, \theta_r/4]$, phase A continues to use the second set of torque
(Continued)

thresholds, phase B continues to use the first set of torque thresholds, and the total torque is controlled between $[T_e+\text{th}1_{low}$ and $T_e+\text{th}1_{up}]$. This suppresses torque ripples of a four-phase switched reluctance motor and provides great engineering application values.

2 Claims, 1 Drawing Sheet

(51) Int. Cl.
  *H02P 25/098* (2016.01)
  *H02P 6/00* (2016.01)
  *H02P 25/28* (2006.01)

(58) Field of Classification Search
  IPC .......................................................... H02P 6/10
  See application file for complete search history.

(56) References Cited

U.S. PATENT DOCUMENTS

| | | | |
|---|---|---|---|
| 9,698,711 B2* | 7/2017 | Hayashi | H02P 6/10 |
| 2001/0015633 A1* | 8/2001 | Nishimura | H02P 6/085 |
| | | | 318/599 |
| 2002/0109476 A1 | 8/2002 | Kim | |
| 2006/0091755 A1* | 5/2006 | Carlisle | H02K 19/103 |
| | | | 310/168 |
| 2008/0203958 A1* | 8/2008 | Suzuki | B62D 5/046 |
| | | | 318/629 |
| 2015/0168496 A1* | 6/2015 | Moura | G01L 3/22 |
| | | | 702/182 |

* cited by examiner

FOUR-PHASE SWITCHED RELUCTANCE MOTOR TORQUE RIPPLE THREE-LEVEL SUPPRESSION METHOD

CROSS REFERENCE TO RELATED APPLICATIONS

This application is a national stage filing under section 371 of International Application No. PCT/CN2015/087501, filed on Aug. 19, 2015, and published in Chinese on Mar. 3, 2016, as WO 2016/029816 A1, which claims priority of Chinese Patent Application No. 201410432801.5 filed on Aug. 27, 2014, the entire content of said applications being hereby incorporated herein by reference.

FIELD OF THE INVENTION

The present invention relates to a method for three-level suppression of torque ripple of switched reluctance motor, and is applicable to a four-phase switched reluctance motor drive system.

BACKGROUND OF THE INVENTION

Switched reluctance motor attracts great attention owing to its simple and firm structure, low manufacturing cost and good speed control performance. However, its special double salient structure and switch-type exciting mode make the electromagnetic torque it outputs have large ripple, seriously affecting its application fields. For this, the researchers provides various methods to eliminate torque ripple and meanwhile realize minimum copper loss. These methods obtain a good effect within certain speed range. Nevertheless, when the rotational speed is high, due to limited DC supply voltage, the ability of the system to control and track desired current, desired flux linkage and desired torque is weakened and it is difficult to effectively eliminate torque ripple. Furthermore, due to the limitation of maximum endurable current of winding and the volt-ampere capacity of semiconductor devices, switched reluctance motor system has an upper limit of current and the limitation of current makes switched reluctance motor only is able to output smooth torque within a limited range. Therefore, all the controls over output of smooth torques have a specific operable range.

SUMMARY OF THE INVENTION

The object of the present invention is to overcome the problem in the prior art and provide a method for three-level suppression of torque ripple of four-phase switched reluctance motor.

The present invention provides a method for three-level suppression of torque ripple of four-phase switched reluctance motor, comprising the following steps:

a. Setting a first set of torque thresholds ($th1_{low}$, $th1_{zero}$, $th1_{up}$) in rotor position interval [$0°$, $\theta_r/4$], and a second set of torque thresholds ($th2_{low}$, $th2_{zero}$, $th2_{up}$) in rotor position interval [$\theta_r/4$, $\theta_r/2$], wherein these six torque thresholds meet the following conditions:

$$th1_{up} > th1_{zero} > th2_{up} > 0 \quad (1)$$

$$0 > th1_{low} > th2_{zero} > th2_{low} \quad (2)$$

$$|th1_{zero}| = |th2_{zero}| \quad (3)$$

$$|th1_{up}| = |th2_{low}| \quad (4)$$

$$|th2_{up}| = |th1_{low}| \quad (5)$$

Wherein, rotor position $0°$ is minimum phase inductance position, rotor position $\theta_r$ is angular pitch, i.e.: one rotor cycle, and a half rotor cycle is $\theta_r/2$;

b. Setting excited state $S_A$ as power supply excited state of phase A, wherein excited state $S_A=1$ means exciting voltage of phase A is positive, excited state $S_A=0$ means exciting voltage of phase A is zero, and excited state $S_A=-1$ means exciting voltage of phase A is negative; setting excited state $S_B$ as power supply excited state of phase B, wherein excited state $S_B=1$ means exciting voltage of phase B is positive, excited state $S_B=0$ means exciting voltage of phase B is 0 and excited state $S_B=-1$ means exciting voltage of phase B is negative; and the desired total smooth torque is $T_e$;

c. Power is supplied to adjacent phase A and phase B for excitations, the power supplied for excitation to phase A leads the power supplied for excitation to phase B by $\theta_r/4$. At this moment, phase A is disconnected, phase B is connected and three-level suppression of torque ripple of four-phase switched reluctance motor is realized by dividing the commutation process from phase A to phase B into two intervals.

Dividing the commutation process from phase A to phase B into two intervals is as follows:

(1) In rotor position interval [$0°$, $\theta_1$], phase A uses the second set of torque thresholds ($th2_{low}$, $th2_{zero}$, $th2_{up}$), phase B uses the first set of torque thresholds ($th1_{low}$, $th1_{zero}$, $th1_{up}$), critical position $\theta_1$ appears automatically in the commutation process, and no extra calculation is needed;

(1.1) Phase B conduction cycle is started in rotor position $0°$, initial excited state $S_B=1$ is set, and phase B current and torque increase from 0; excited state $S_A$ maintains original state $S_A=1$, and phase A current and torque increase. Total torque increases;

(1.2) When total torque increases to torque value $T_e+th2_{up}$, excited state $S_A$ is converted from 1 to $-1$, and phase A torque decreases; phase B maintains original state, and phase B torque continues to increase. As phase B inductance change rate and phase current are small at this moment, the increase rate of phase B torque is smaller than the decrease rate of phase A torque, the change trend of total torque is determined by phase A, and total torque decreases;

(1.3) When total torque first decreases to torque value $T_e+th1_{low}$, phase A and phase B state transfer conditions are not met, excited states $S_A$ and $S_B$ maintain original states and total torque continues to decrease;

(1.4) When total torque decreases to torque value $T_e+th2_{zero}$, conversion of phase A state from excited state $S_A=-1$ to excited state $S_A=0$ is triggered, and phase A torque decreases, but the decrease rate is smaller than that when excited state $S_A=-1$; phase B maintains original excited state and torque continues to increase. At this moment, under the condition of excited state $S_A=0$ and excited state $S_B=1$, the decrease rate of phase A torque is larger than the increase rate of phase B torque, and total torque decreases;

(1.5) When total torque decreases to torque value $T_e+th2_{low}$, phase A state transfer conditions are met, phase A state is converted from excited state $S_A=0$ to excited state $S_A=1$ and phase A torque increases;

phase B maintains original state and torque continues to increase; total torque increases;

(1.6) When total torque increases to torque value $T_e+th2_{zero}$ and $T_e+th1_{low}$ in turn, but phase A and phase B state transfer conditions are not met in both cases, total torque continues to increase;

(1.7) When total torque increases to torque value $T_e+th2_{up}$, steps (1.2)~(1.6) are repeated, and phase B state is not triggered and changed and maintains excited state $S_B=1$; phase A excited state $S_A$ is switched among 1, 0 and −1, and total torque is controlled within $[T_e+th2_{low}, T_e+th2_{up}]$, thereby suppressing ripple of four-phase switched reluctance motor torque in rotor position interval $[0°, \theta_1]$;

(1.8) With the increase of rotor position, phase B inductance change rate and current increase to certain level. After a critical position is reached, when excited state $S_A=0$ and excited state $S_B=1$, the decrease rate of phase A torque is smaller than the increase rate of phase B torque and total torque increases;

(2) In rotor position interval $[\theta_1, \theta_r/4]$, phase A continues to use the second set of torque thresholds ($th2_{low}$, $th2_{zero}$, $th2_{up}$) and phase B continues to use the first set of torque thresholds ($th1_{low}$, $th1_{zero}$, $th1_{up}$), (2.1) In rotor position $\theta_1$, total torque reaches torque value $T_e+th2_{up}$ and phase A state is switched to excited state $S_A=-1$; phase B maintains excited state $S_B=1$, and in this position the decrease rate of phase A torque under the excitation of negative supply voltage is larger than the increase rate of phase B torque under the excitation of positive supply voltage, so total torque decreases. However, this situation is changed subsequently. Following the increase of rotor position, although the excited states of phase A and phase B both remain unchanged, the decrease rate of phase A torque in excited state $S_A=-1$ is smaller than the increase rate of phase B torque in excited state $S_B=1$, thereby total torque increases;

(2.2) When total torque increases to torque value $T_e+th2_{up}$, neither excited state $S_A$ nor excited state $S_B$ is triggered and changed and total torque continues to increase;

(2.3) When total torque reaches torque value $T_e+th1_{zero}$, phase B state transfer conditions are met, excited state $S_B$ is converted into 0 and phase B torque decreases; phase A maintains original excited state $S_A=-1$ and total torque decreases;

(2.4) When total torque decreases to torque value $T_e+th2_{up}$, neither excited state $S_A$ nor excited state $S_B$ is triggered and changed and total torque continues to decrease;

(2.5) When total torque decreases to torque value $T_e+th1_{low}$, phase B state transfer conditions are met, excited state $S_B$ is converted into 1 and phase B torque increases; phase A maintains original excited state $S_A=-1$ and total torque increases;

(2.6) Steps (2.2)~(2.5) are repeated, excited state $S_A$ remains to be −1 and phase A torque and current continue to decrease; excited state $S_B$ is switched between 0 and 1, and total torque is controlled within $[T_e+th1_{low}, T_e+th1_{zero}]$, thereby suppressing ripple of four-phase switched reluctance motor torque in rotor position interval $[\theta_1, \theta_r/4]$;

(2.7) When the rotor is in a critical position and phase B torque increases when excited state $S_B=0$, and the increase rate is larger than the decrease rate of phase A torque in excited state $S_A=-1$. At this moment, total torque increases;

(2.8) When total torque increases to torque value $T_e+th1_{up}$, phase B state is triggered and changed, excited state $S_B$ is converted from 0 to −1 and phase B torque decreases; phase A torque continues to decrease and total torque decreases;

(2.9) When total torque decreases to torque value $T_e+th1_{zero}$ and torque value $T_e+th2_{up}$ in turn, neither excited state $S_A$ nor excited state $S_B$ is triggered and changed, and total torque continues to decrease;

(2.10) When total torque decreases to torque value $T_e+th1_{low}$, excited state $S_B$ is triggered and changed into 1 and phase B torque increases; phase A maintains original state, phase A torque continues to decrease and total torque increases;

(2.11) When total torque increases to torque value $T_e+th1_{zero}$, excited state $S_B$ is triggered and changed into 0 and excited state $S_A$ remains to be −1. The situation at this moment is same as that of (2.7). Steps (2.7)~(2.11) are repeated, excited state $S_A$ remains to be −1, excited state $S_B$ is switched among −1, 0 and 1, and total torque is controlled within $[T_e+th1_{low}, T_e+th1_{up}]$, thereby suppressing the ripple of four-phase switched reluctance motor torque in rotor position interval $[\theta_1, \theta_r/4]$;

(2.12) When the rotor is in a critical position and phase B torque no longer increases but decreases when excited state $S_B=0$ and excited state $S_A=-1$, step (2.2)~2.5) are repeated from this moment and total torque is controlled within $[T_e+th1_{low}, T_e+th1_{zero}]$, thereby suppressing ripple of four-phase switched reluctance motor torque in rotor position interval $[\theta_1, \theta_r/4]$.

Beneficial effect: Due to adoption of the foregoing technical scheme, by setting two sets of torque thresholds and adjacent phase A and phase B excited states, the present invention makes phase A and phase B switch among three excited states in which power supply exciting voltage is positive, zero and negative respectively, controls total torque be between the two sets of torque thresholds, suppresses ripple of four-phase switched reluctance motor torque and realizes smooth control of direct and transient torque of four-phase switched reluctance motor. The waveform of the exciting voltage the motor winding receives and the waveform of desired voltage have the same features. The actual phase current is highly identical to desired phase current so that switched reluctance motor outputs smooth torque in a maximum range. The present invention has high universality, a desirable practical effect and a broad application prospect and is applicable to various types of four-phase switched reluctance motor drive systems with various structures.

DETAILED DESCRIPTION OF THE EMBODIMENTS

Figure 1:
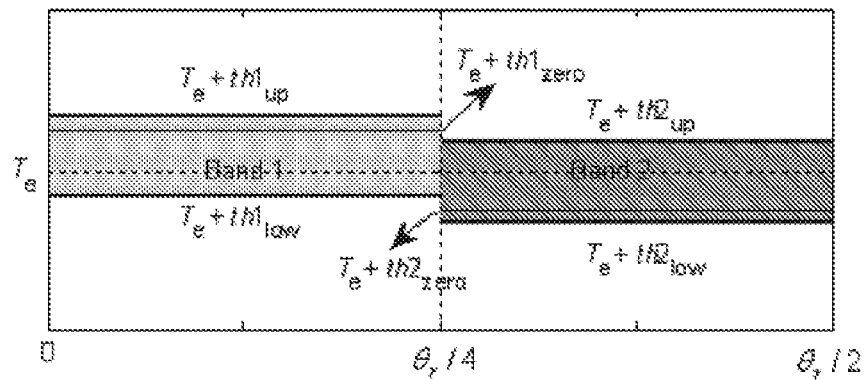
FIG. 1 is a schematic diagram of setting of three-level torque thresholds of switched reluctance motor provided by the present invention.

The present invention is further described below in connection with the embodiments shown in accompanying drawings:

As shown in FIG. 1, for one four-phase switched reluctance motor, the specific steps are as follows:

a. Setting a first set of torque thresholds ($th1_{low}$, $th1_{zero}$, $th1_{up}$) in rotor position interval [0°, $\theta_r/4$], and a second set of torque thresholds ($th2_{low}$, $th2_{zero}$, $th2_{up}$) in rotor position interval [$\theta_r/4$, $\theta_r/2$], wherein these six torque thresholds meet the following conditions:

$$th1_{up} > th1_{zero} > th2_{up} > 0 \quad (1)$$

$$0 > th1_{low} > th2_{zero} > th2_{low} \quad (2)$$

$$|th1_{zero}| = |th2_{zero}| \quad (3)$$

$$|th1_{up}| = |th2_{low}| \quad (4)$$

$$|th2_{up}| = |th1_{low}| \quad (5)$$

Figures 2A, 2B:
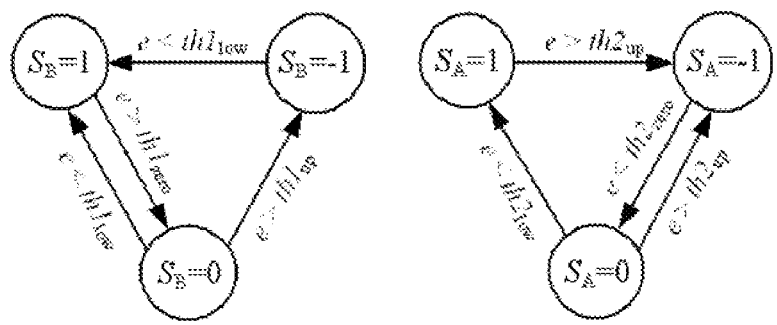
FIG. 2(a) is a schematic diagram of conversion of power supply excited state of phase B of switched reluctance motor provided by the present invention.
FIG. 2(b) is a schematic diagram of conversion of power supply excited state of phase A of switched reluctance motor provided by the present invention.

Wherein, rotor position 0° is minimum phase inductance position, rotor position $\theta_r$ is angular pitch, i.e.: one rotor cycle, and a half rotor cycle is $\theta_r/2$;

b. As shown in FIG. 2, setting excited state $S_A$ as power supply excited state of phase A, wherein excited state $S_A=1$ means exciting voltage of phase A is positive, excited state $S_A=0$ means exciting voltage of phase A is zero, and excited state $S_A=-1$ means exciting voltage of phase A is negative; setting excited state $S_B$ as power supply excited state of phase B, wherein excited state $S_B=1$ means exciting voltage of phase B is positive, excited state $S_B=0$ means exciting voltage of phase B is 0 and excited state $S_B=-1$ means exciting voltage of phase B is negative; and the desired total smooth torque is $T_e$;

c. Power is supplied to adjacent phase A and phase B for excitations, the power supplied for excitation to phase A leads the power supplied for excitation to phase B by $\theta_r/4$. At this moment, phase A is disconnected, phase B is connected, and the commutation process from phase A to phase B is divided into two intervals, as shown in FIG. 1:

(1) In rotor position interval [0°, $\theta_1$], phase A uses the second set of torque thresholds ($th2_{low}$, $th2_{zero}$, $th2_{up}$), phase B uses the first set of torque thresholds ($th1_{low}$, $th1_{zero}$, $th1_{up}$), critical position $\theta_1$ appears automatically in the commutation process, and no extra calculation is needed;

(1.1) Phase B conduction cycle is started in rotor position 0°, initial excited state $S_B=1$ is set, and phase B current and torque increase from 0; excited state $S_A$ maintains original state $S_A=1$, and phase A current and torque increase. Total torque increases;

(1.2) When total torque increases to torque value $T_e+th2_{up}$, excited state $S_A$ is converted from 1 to −1, and phase A torque decreases; phase B maintains original state, and phase B torque continues to increase. As phase B inductance change rate and phase current are small at this moment, the increase rate of phase B torque is smaller than the decrease rate of phase A torque, the change trend of total torque is determined by phase A, and total torque decreases;

(1.3) When total torque first decreases to torque value $T_e+th1_{low}$, phase A and phase B state transfer conditions are not met, excited states $S_A$ and $S_B$ maintain original states and total torque continues to decrease;

(1.4) When total torque decreases to torque value $T_e+th2_{zero}$, phase A state is triggered to convert from excited state $S_A=-1$ to excited state $S_A=0$, and phase A torque decreases, but the decrease rate is smaller than that when excited state $S_A=-1$; phase B maintains original excited state and torque continues to increase. At this moment, under the condition of excited state $S_A=0$ and excited state $S_B=1$, the decrease rate of phase A torque is larger than the increase rate of phase B torque, and total torque decreases;

(1.5) When total torque decreases to torque value $T_e+th2_{low}$, phase A state transfer conditions are met, phase A state is converted from excited state $S_A=0$ to excited state $S_A=1$ and phase A torque increases; phase B maintains original state and torque continues to increase; total torque increases;

(1.6) When total torque increases to torque value $T_e+th2_{zero}$ and $T_e+th1_{low}$ in turn, but phase A and phase B state transfer conditions are not met in both cases, total torque continues to increase;

(1.7) When total torque increases to torque value $T_e+th2_{up}$, steps (1.2)~(1.6) are repeated, and phase B state is not triggered and changed and maintains excited state $S_B=1$; phase A excited state is switched among 1, 0 and −1, and total torque is controlled within [$T_e+th2_{low}$, $T_e+th2_{up}$], thereby suppressing ripple of four-phase switched reluctance motor torque in rotor position interval [0°, $\theta_1$];

(1.8) With the increase of rotor position, phase B inductance change rate and current increase to a certain level. After a critical position is reached, when excited state $S_A=0$ and excited state $S_B=1$, the decrease rate of phase A torque is smaller than the increase rate of phase B torque and total torque increases;

(2) In rotor position interval [$\theta_1$, $\theta_r/4$], phase A continues to use the second set of torque thresholds ($th2_{low}$, $th2_{zero}$, $th2_{up}$) and phase B continues to use the first set of torque thresholds ($th1_{low}$, $th1_{zero}$, $th1_{up}$):

(2.1) In rotor position $\theta_1$, total torque reaches torque value $T_e+th2_{up}$ and phase A state is switched to excited state $S_A=-1$; phase B maintains excited state $S_B=1$. In this position, the decrease rate of phase A torque under the excitation of negative supply voltage is larger than the increase rate of phase B torque under the excitation of positive supply voltage, so total torque decreases. However, this situation is changed subsequently. Following the increase of rotor position, although the excited states of phase A and phase B both remain unchanged, the torque decrease rate of phase A in excited state $S_A=-1$ is smaller than the torque increase rate of phase B in excited state $S_B=1$, thereby total torque increases;

(2.2) When total torque increases to torque value $T_e+th2_{up}$, neither excited state $S_A$ nor excited state $S_B$ is triggered and changed and total torque continues to increase;

(2.3) When total torque reaches torque value $T_e+th1_{zero}$, phase B state transfer conditions are met, excited state $S_B$ is converted into 0 and phase B torque decreases; phase A maintains original excited state $S_A=-1$ and total torque decreases;

(2.4) When total torque decreases to torque value $T_e+th2_{up}$, neither excited state $S_A$ nor excited state $S_B$ is triggered and changed, and total torque continues to decrease;

(2.5) When total torque decreases to torque value $T_e+th1_{low}$, phase B state transfer conditions are met, excited state $S_B$ is converted into 1 and phase B torque increases; phase A maintains original excited state $S_A=-1$ and total torque increases;

(2.6) Steps (2.2)~(2.5) are repeated, excited state $S_A$ remains to be −1 and phase A torque and current continue to decrease; excited state $S_B$ is switched between 0 and 1, and total torque is controlled within $[T_e+th1_{low}, T_e+th1_{zero}]$, thereby suppressing ripple of four-phase switched reluctance motor torque in rotor position interval $[\theta_1, \theta_r/4]$;

(2.7) When the rotor is in a critical position and phase B torque increases in excited state $S_B=0$, and the increase rate is larger than the decrease rate of phase A torque in excited state $S_A=-1$. At moment, total torque increases;

(2.8) When total torque increases to torque value $T_e+th1_{up}$, phase B state is triggered and changed, excited state $S_B$ is converted from 0 to −1 and phase B torque decreases; phase A torque continues to decrease and total torque decreases;

(2.9) When total torque decreases to torque value $T_3+th1_{zero}$ and torque value $T_e+th2_{up}$ in turn, neither excited state $S_A$ nor excited state $S_B$ is triggered and changed, and total torque continues to decrease;

(2.10) When total torque decreases to torque value $T_e+th1_{low}$, excited state $S_B$ is triggered and changed into 1 and phase B torque increases; phase A maintains original state, phase A torque continues to decrease and total torque increases;

(2.11) When total torque increases to torque value $T_e+th1_{zero}$, excited state $S_B$ is triggered and changed into 0 and excited state $S_A$ remains to be −1. The situation at this moment is same as that of (2.7). Steps (2.7)~(2.11) are repeated, excited state $S_A$ remains to be −1, excited state $S_B$ is switched among −1, 0 and 1, and total torque is controlled within $[T_e+th1_{low}, T_e+th1_{up}]$, thereby suppressing the ripple of four-phase switched reluctance motor torque in rotor position interval $[\theta_1, \theta_r/4]$;

(2.12) When the rotor is in a critical position and phase B torque is in excited state $S_B=0$ and excited state $S_A=-1$, total torque no longer increases but decreases. Steps (2.2)~(2.5) are repeated from this moment and total torque is controlled within $[T_e+th1_{low}, T_e+th1_{zero}]$, thereby suppressing ripple of four-phase switched reluctance motor torque in rotor position interval $[\theta_1, \theta_r/4]$.

For adjacent phase B and phase C power supply excitations, when phase B power supply excitation is $\theta_r/4$ ahead of phase C power supply excitation, torque threshold setting, commutation process, and phase B and phase C excited state switching and transfer methods are similar to the foregoing circumstance.

For adjacent phase C and phase D power supply excitations, when phase C power supply excitation is $\theta_r/4$ ahead of phase D power supply excitation, torque threshold setting, commutation process, and phase C and phase D excited state switching and transfer methods are similar to the foregoing circumstance.

For adjacent phase D and phase A power supply excitations, when phase D power supply excitation is $\theta_r/4$ ahead of phase A power supply excitation, torque threshold setting, commutation process, and phase D and phase A excited state switching and transfer methods are similar to the foregoing circumstance.

Figure 3:
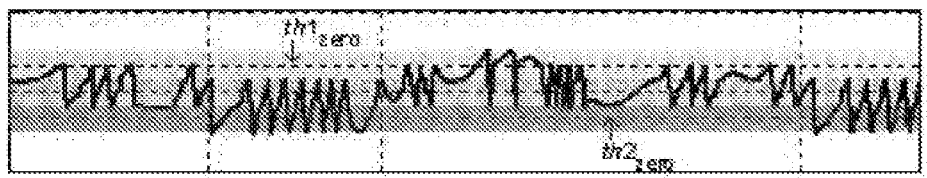
FIG. 3 is torque waveform of switched reluctance motor provided by the present invention.

The acquired switched reluctance motor torque waveform is shown in FIG. 3.

What is claimed is:

1. A method for three-level suppression of a torque ripple of a four-phase switched reluctance motor, comprising the following steps:

a. setting a first set of torque thresholds ($th1_{low}$, $th1_{zero}$, $th1_{up}$) in rotor position interval $[0°, \theta_r/4]$, and a second set of torque thresholds ($th2_{low}$, $th2_{zero}$, $th2_{up}$) in rotor position interval $[\theta_r/4, \theta_r/2]$, wherein the first and second set of torque thresholds meet the following conditions:

$$th1_{up}>th1_{zero}>th2_{up}>0 \quad (1)$$

$$0>th1_{low}>th2_{zero}>th2_{low} \quad (2)$$

$$|th1_{zero}|=|th2_{zero}| \quad (3)$$

$$|th1_{up}|=|th2_{low}| \quad (4)$$

$$|th2_{up}|=|th1_{low}| \quad (5)$$

wherein, rotor position 0° denotes a minimum phase inductance position, rotor position $\theta_r$ denotes an angular pitch that is equal to one rotor cycle, and $\theta_r/2$ denotes a half rotor cycle;

b. setting excited state $S_A$ as a power supply excited state of phase A, wherein excited state $S_A=1$ means phase A exciting voltage is positive, excited state $S_A=0$ means phase A exciting voltage is zero, and excited state $S_A=-1$ means phase A exciting voltage is negative; setting excited state $S_B$ as a power supply excited state of phase B, wherein excited state $S_B=1$ means phase B exciting voltage is positive, excited state $S_B=0$ means phase B exciting voltage is 0 and excited state $S_B=-1$ means phase B exciting voltage is negative; and desired total smooth torque is $T_e$;

c. power is supplied to adjacent phase A and phase B for excitations, wherein the power supplied for excitation to phase A leads the power supplied for excitation to phase B by $\theta_r/4$, such that when phase A is disconnected, phase B is connected and a three-level suppression of a torque ripple of a four-phase switched reluctance motor is realized by dividing commutation process from phase A to phase B into two intervals.

2. The method for three-level suppression of the torque ripple of the four-phase switched reluctance motor according to claim 1, wherein dividing a commutation process from phase A to phase B into two intervals comprises the following steps:

(1) in rotor position interval $[0°, \theta_1]$, phase A uses the second set of torque thresholds ($th2_{low}$, $th2_{zero}$, $th2_{up}$), phase B uses the first set of torque thresholds ($th1_{low}$, $th1_{zero}$, $th1_{up}$), critical position $\theta_1$ appears automatically in the commutation process, and no extra calculation is needed;

(1.1) phase B conduction cycle is started in rotor position 0°, initial excited state $S_B=1$ is set, and phase B current and torque increase from 0; excited state $S_A$ maintains original state $S_A=1$, phase A current and torque increase, and total torque increases;

(1.2) when total torque increases to torque value $T_e+th2_{up}$, excited state $S_A$ is converted from 1 to −1, and phase A torque decreases; phase B maintains original state, and phase B torque continues to increase; as phase B inductance change rate and phase current are small at this moment, increase rate of phase B torque is smaller than the decrease rate of phase A torque, the change trend of total torque is determined by phase A, and the total torque decreases;

(1.3) when total torque first decreases to torque value $T_e+th1_{low}$, phase A and phase B state transfer conditions are not met, excited states $S_A$ and $S_B$ maintain original states and total torque continues to decrease;

(1.4) when total torque decreases to torque value $T_e+th2_{zero}$, phase A state is triggered to convert from excited state $S_A=-1$ to excited state $S_A=0$, and phase A torque decreases, but the phase A decrease rate is smaller than that when excited state $S_A=-1$; phase B maintains original excited state and the phase B torque continues to increase; and wherein under a condition of excited state $S_A=0$ and excited state $S_B=1$, the phase A torque decrease rate is larger than the phase B torque increase rate, and the total torque decreases;

(1.5) when the total torque decreases to a torque value $T_e+th2_{low}$, phase A state transfer conditions are met, phase A state is converted from excited state $S_A=0$ to excited state $S_A=1$, and phase A torque increases; phase B maintains original state and phase B torque continues to increase; and the total torque increases;

(1.6) When the total torque increases to a torque value $T_e+th2_{zero}$ and $T_e+th1_{low}$ in turn, but phase A and phase B state transfer conditions are not met in both cases, the total torque continues to increase;

(1.7) When the total torque increases to a torque value $T_e+th2_{up}$, steps (1.2) through (1.6) are repeated, and phase B state is not triggered, is not changed, and maintains excited state $S_B=1$; phase A excited state is switched among 1, 0 and −1, and the total torque is controlled within $[T_e+th2_{low}, T_e+th2_{up}]$, thereby suppressing the torque ripple of the four-phase switched reluctance motor in rotor position interval $[0°, \theta_1]$;

(1.8) with an increase of rotor position, the phase B inductance change rate and current increase to a certain level; after a critical position is reached, when excited state $S_A=0$ and excited state $S_B=1$, the phase A torque decrease rate is smaller than the phase B torque increase rate and the total torque increases;

(2) in rotor position interval $[\theta_1, \theta_r/4]$, phase A continues to use the second set of torque thresholds ($th2_{low}$, $th2_{zero}$, $th2_{up}$) and phase B continues to use the first set of torque thresholds ($th1_{low}$, $th1_{zero}$, $th1_{up}$);

(2.1) in rotor position $\theta_1$, the total torque reaches a torque value $T_e+th2_{up}$ and phase A state is switched to excited state $S_A=-1$; phase B maintains excited state $S_B=1$, and in this position the decrease rate of phase A torque under the excitation of negative supply voltage is larger than the increase rate of phase B torque under excitation of positive supply voltage, such that the total torque decreases; and wherein, following an increase of rotor position, although the excited states of phase A and phase B both remain unchanged, the decrease rate of phase A torque in excited state $S_A=-1$ is smaller than the increase rate of phase B torque in excited state $S_B=1$, such that the total torque increases;

(2.2) when the total torque increases to a torque value $T_e+th2_{up}$, neither the excited state $S_A$ nor the excited state $S_B$ is triggered or changed, and the total torque continues to increase;

(2.3) when the total torque reaches a torque value $T_e+th1_{zero}$, phase B state transfer conditions are met, excited state $S_B$ is converted into 0 and phase B torque decreases; phase A maintains original excited state $S_A=-1$, and the total torque decreases;

(2.4) when the total torque decreases to a torque value $T_e+th2_{up}$, neither the excited state $S_A$ nor the excited state $S_B$ is triggered or changed, and the total torque continues to decrease;

(2.5) when the total torque decreases to a torque value $T_e+th1_{low}$, phase B state transfer conditions are met, the excited state $S_B$ is converted into 1 and the phase B torque increases; phase A maintains original excited state $S_A=-1$; and the total torque increases;

(2.6) steps (2.2) through (2.5) are repeated, the excited state $S_A$ remains equal to −1 and the phase A torque and phase A current continue to decrease; the excited state $S_B$ is switched between 0 and 1, and the total torque is controlled within $[T_e+th1_{low}, T_e+th1_{zero}]$, thereby suppressing the torque ripple of the four-phase switched reluctance motor in rotor position interval $[\theta_1, \theta_r/4]$;

(2.7) when the rotor is in a critical position and the phase B torque increases in excited state $S_B=0$, and the phase B torque increase rate is larger than decrease rate of phase A torque in excited state $S_A=-1$ the total torque increases;

(2.8) when the total torque increases to a torque value $T_e+th1_{up}$, the phase B state is triggered and changed, the excited state $S_B$ is converted from 0 to −1 and the phase B torque decreases; the phase A torque continues to decrease, and the total torque decreases;

(2.9) when the total torque decreases to a torque value $T_e+th1_{zero}$ and a torque value $T_e+th2_{up}$ in turn, neither the excited state $S_A$ nor the excited state $S_B$ is triggered or changed, and the total torque continues to decrease;

(2.10) when the total torque decreases to a torque value $T_e+th1_{low}$, the excited state $S_B$ is triggered and changed to and the phase B torque increases; phase A maintains original state, the phase A torque continues to decrease, and the total torque increases;

(2.11) when the total torque increases to a torque value $T_e+th1_{zero}$, the excited state $S_B$ is triggered and changed to 0, and the excited state $S_A$ remains equal to −1; steps (2.7) through (2.11) are repeated, the excited state $S_A$ remains equal to −1, the excited state $S_B$ is switched among −1, 0 and 1, and the total torque is controlled within $[T_e+th1_{low}, T_e+th1_{up}]$, thereby suppressing the torque ripple of the four-phase switched reluctance motor in rotor position interval $[\theta_1, \theta_r/4]$; and (2.12) when the rotor is in a critical position and the phase B torque is in an excited state $S_B=0$ and an excited state $S_A=-1$, the total torque no longer increases but decreases; steps (2.2) through (2.5) are repeated and the total torque is controlled within $[T_e+th1_{low}, T_e+th1_{zero}]$, thereby suppressing the torque ripple of the four-phase switched reluctance motor in rotor position interval $[\theta_1, \theta_r/4]$.

* * * * *